(12) United States Patent
Anonsen

(10) Patent No.: US 7,613,715 B2
(45) Date of Patent: *Nov. 3, 2009

(54) MAP AND DATA LOCATION PROVIDER

(75) Inventor: Steven Anonsen, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 473 days.

This patent is subject to a terminal disclaimer.

(21) Appl. No.: 11/400,661

(22) Filed: Apr. 7, 2006

(65) Prior Publication Data

US 2006/0235867 A1 Oct. 19, 2006

Related U.S. Application Data

(63) Continuation of application No. 10/199,949, filed on Jul. 20, 2002, now Pat. No. 7,130,856.

(51) Int. Cl.
*G06F 7/00* (2006.01)
*G06F 17/00* (2006.01)

(52) U.S. Cl. ............... 707/101; 707/1; 707/10; 707/200

(58) Field of Classification Search .............. 707/1–10, 707/100–104.1, 200–206; 709/217, 219, 709/249; 715/713, 853

See application file for complete search history.

(56) References Cited

U.S. PATENT DOCUMENTS

| 5,295,256 | A | 3/1994 | Bapat .................... 395/500 |
| 5,499,371 | A | 3/1996 | Henninger et al. .......... 395/700 |
| 5,615,362 | A | 3/1997 | Jensen et al. ............ 707/103 R |
| 5,630,127 | A | 5/1997 | Moore et al. ............ 707/103 R |
| 5,765,159 | A | 6/1998 | Srinivasan .................. 707/102 |
| 5,873,093 | A | 2/1999 | Williamson et al. ......... 707/103 |
| 5,893,108 | A | 4/1999 | Srinivasan et al. ...... 707/103 R |
| 5,897,634 | A | 4/1999 | Attaluri et al. ................ 707/8 |
| 5,925,100 | A | 7/1999 | Drewry et al. ............. 709/219 |
| 5,960,438 | A | 9/1999 | Chang et al. ........... 707/103 R |
| 6,047,284 | A | 4/2000 | Owens ......................... 707/4 |
| 6,108,664 | A | 8/2000 | Nori et al. .................. 707/103 |
| 6,122,641 | A | 9/2000 | Williamson et al. ......... 707/103 |
| 6,144,377 | A | 11/2000 | Oppermann et al. ........ 715/744 |
| 6,374,252 | B1 | 4/2002 | Althoff et al. .............. 707/102 |
| 6,611,840 | B1 | 8/2003 | Baer et al. ................ 707/102 |
| 6,633,886 | B1 | 10/2003 | Chong ....................... 707/102 |
| 6,647,391 | B1 | 11/2003 | Smith et al. ................ 707/100 |
| 6,684,222 | B1 | 1/2004 | Cornelius et al. ........ 707/104.1 |
| 6,704,744 | B1 | 3/2004 | Williamson et al. ......... 707/103 |
| 6,754,670 | B1 | 6/2004 | Lindsay et al. ............. 707/103 |
| 6,947,946 | B2 | 9/2005 | Nishikawa .................. 707/102 |

(Continued)

OTHER PUBLICATIONS

Chu et al., Optimal Query Processing for Distributed Database Systems, Sep. 1982, IEEE, vol. C-31, 835-850.*

(Continued)

*Primary Examiner*—Jean B Fleurantin
(74) *Attorney, Agent, or Firm*—Westman, Champlin & Kelly, P.A.

(57) ABSTRACT

A map provider and a data location provider provide information as to how the data pertaining to entities is stored in a database system and where the data is stored in the database system. A data accessing system uses the information to process requests to perform an operation on the data.

12 Claims, 8 Drawing Sheets

U.S. PATENT DOCUMENTS

2003/0037056 A1    2/2003  Sedlar ........................ 707/100

OTHER PUBLICATIONS

Subramanian et al., The AQUA approach to querying lists and trees in object-oriented databases, Mar. 6-10, 1995, IEEE, 80-89.*
Office Action for U.S. Appl. No. 10/199,956, filed Jul. 20, 2002.
U.S. Appl. No. 10/199,956, filed Jul. 20, 2002.
Office Action dated Apr. 5, 2005 for U.S. Appl. No. 10/199,956, filed Jul. 20, 2002.
Amendment filed Jun. 14, 2005 for U.S. Appl. No. 10/199,956, filed Jul. 20, 2002.
Final Office Action dated Sep. 7, 2005 for U.S. Appl. No. 10/199,956, filed Jul. 20, 2002.
Response After Final faxed Nov. 7, 2005 for U.S. Appl. No. 10/199,956, filed Jul. 20, 2002.
U.S. Appl. No. 10/199,949, filed Dec. 12, 2005.
Office Action dated Nov. 16, 2004 for U.S. Appl. No. 10/199,949, filed Jul. 20, 2002.
Amendment filed May 16, 2005 for U.S. Appl. No. 10/199,949, filed Jul. 20, 2002.
Final Office Action dated Jul. 26, 2005 for U.S. Appl. No. 10/199,949, filed Jul. 20, 2002.
Response After Final dated Aug. 25, 2005 for U.S. Appl. No. 10/199,949, filed Jul. 20, 2002.
Office Action dated Dec. 1, 2005 for U.S. Appl. No. 10/199,949, filed Jul. 20, 2002.
Amendment filed Dec. 12, 2005 for U.S. Appl. No. 10/199,949, filed Jul. 20, 2002.
European Search Report.

* cited by examiner

| COMPANY_ID 252 | ORDER_ID 254 | ORDERLINE_ID 256 | SERIAL NO 258 | OTHER COLUMNS | |
|---|---|---|---|---|---|
|  |  |  |  |  |  |
|  |  |  |  |  |  |
|  |  |  |  |  |  |
|  |  |  |  |  |  |
| ⋮ | ⋮ | ⋮ | ⋮ | ⋮ | ⋮ |
|  |  |  |  |  |  |

MAP AND DATA LOCATION PROVIDER

The present application is a continuation of and claims priority of U.S. patent application Ser. No. 10/199,949, filed Jul. 20, 2002, the content of which is hereby incorporated by reference in its entirety.

BACKGROUND OF THE INVENTION

In conventional relational databases, all data are stored in named tables. The tables are described by their features. In other words, the rows of each table contain items of identical type, and the definitions of the columns of the table (i.e., the column names and the data types stored in the column) describe the attributes of each of the instances of the object. By identifying its name, its column names and the data types of the column contents, a table is completely described. Queries to a relational database are formulated in a query language. One such language is SQL (Structure Query Language) which is widely used in commercial relational database systems. The data types offered by SQL can be classified as character arrays (names), numbers, and data types related to date and time. Tables can be modified or combined by several operations of relational algebra such as the application of Boolean operators, projection (i.e. selection of columns) or the Cartesian product.

Relational databases offer several advantages. Database queries are based on a comparison of the table contents. Thus, no pointers are required in relational databases, and all relations are treated uniformly. Further, the tables are independent (they are not related by pointers), so it is easier to maintain dynamic data sets. The tables are easily expandable by simply adding new columns. Also, it is relatively easy to create user-specific views from relational databases.

There are, however, a number of disadvantages associated with relational databases as well. For example, access to data by reference to properties is not optimal in the classical relational data model. This can make such databases cumbersome in many applications.

Another recent technology for database systems is referred to as object oriented database systems. These systems offer more complex data types in order to overcome the restrictions of conventional relational databases. In the context of object oriented database models, an "object" includes both data and the functions (or methods) which can be applied to the object. Each object is a concrete instance of an object class defining the attributes and methods of all its instances. Each instance has its unique identifier by which it can be referred to in the database.

Object oriented databases operate under a number of principles. One such principle is referred to as inheritance. Inheritance means that new object classes can be derived from another class. The new classes inherit the attributes and methods of the other class (the super-class) and offer additional attributes and operations. An instance of the derived class is also an instance of the super-class. Therefore, the relation between a derived class and its super-class is referred to as the "isA" relation.

A second principle related to object oriented databases is referred to as "aggregation." Aggregation means that composite objects may be constructed as consisting of a set of elementary objects. A "container object" can communicate with the objects contained therein by their methods of the contained objects. The relation between the container object and its components is called a "partof" relation because a component is a part of the container object.

Yet another principle related to object oriented databases is referred to as encapsulation. According to encapsulation, an application can only communicate with an object through messages. The operations provided by an object define the set of messages which can be understood by the object. No other operations can be applied to the object.

Another principle related to object oriented databases is referred to as polymorphism. Polymorphism means that derived classes may re-define methods of their super-classes.

Objects present a variety of advantages. For example, operations are an important part of objects. Because the implementations of the operations are hidden to an application, objects can be more easily used by application programs. Further, an object class can be provided as an abstract description for a wide variety of actual objects, and new classes can be derived from the base class. Thus, if an application knows the abstract description and using only the methods provided by, the application can still accommodate objects of the derived classes, because the objects in the derived classes inherit these methods. However, object oriented databases are not yet as widely used in commercial products as relational databases.

Yet another database technology attempts to combine the advantages of the wide acceptance of relational databases and the benefits of the object oriented paradigm. This technology is referred to as object-relational database systems. These databases employ a data model that attempts to add object oriented characteristics to tables. All persistent (database) information is still in tables, but some of the tabular entries can have richer data structure. These data structures are referred to as abstract data types (ADTs). An ADT is a data type that is constructed by combining basic alphanumeric data types. The support for abstract data types presents certain advantages. For example, the methods associated with the new data type can be used to index, store, and retrieve records based on the content of the new data type.

Some conventional object-relational databases support an extended form of SQL, sometimes referred to as ObjectSQL. The extensions are provided to support the object model (e.g., queries involving object attributes). However, these object-relational databases are still relational because the data is stored in tables of rows and columns, and SQL, with some extensions, is the language for data definition, manipulation, and query. Both the target of a query and the result of a query are still tables. The extended SQL language is often still the primary interface to the database. Therefore, there is no direct support of host object languages and their objects. This forces programmers to continue to translate between objects and tables.

Data pertaining to the operation of a business such as types of companies forming an enterprise, orders that the company receives from various customers, and what constitutes an order is hierarchical. As discussed above, relational systems for storing data, on the other hand, are tabular in nature, and consequently, do not directly represent hierarchies. Accordingly, object programming models do not represent the hierarchy of business data very well.

SUMMARY OF THE INVENTION

A map provider and a data location provider provide information as to how the data pertaining to entities is stored in a database system and where the data is stored in the database system. A data accessing system uses the information to process requests to perform an operation on the data.

In one embodiment, the entities are organized in a child/parent hierarchy. Each entity has a unique identifiable position within the child/parent hierarchy. The map and data location providers each can receive an identifier pertaining to the child/parent hierarchy in order to ascertain which map must be used, or where the corresponding data is stored, respectively.

DETAILED DESCRIPTION OF ILLUSTRATIVE EMBODIMENTS

It should be noted that the inventive features of the invention can be applied to O-R databases or relational databases, because the invention bridges the capabilities of both types of databases as well as the capabilities of object oriented programming languages. The result is an O-R database system that provides significant advantages over prior database technology. It will be described herein in terms of applying to an O-R database, for the sake of illustration only, as it is equally beneficial for relational databases.

Overview

Figure 1:
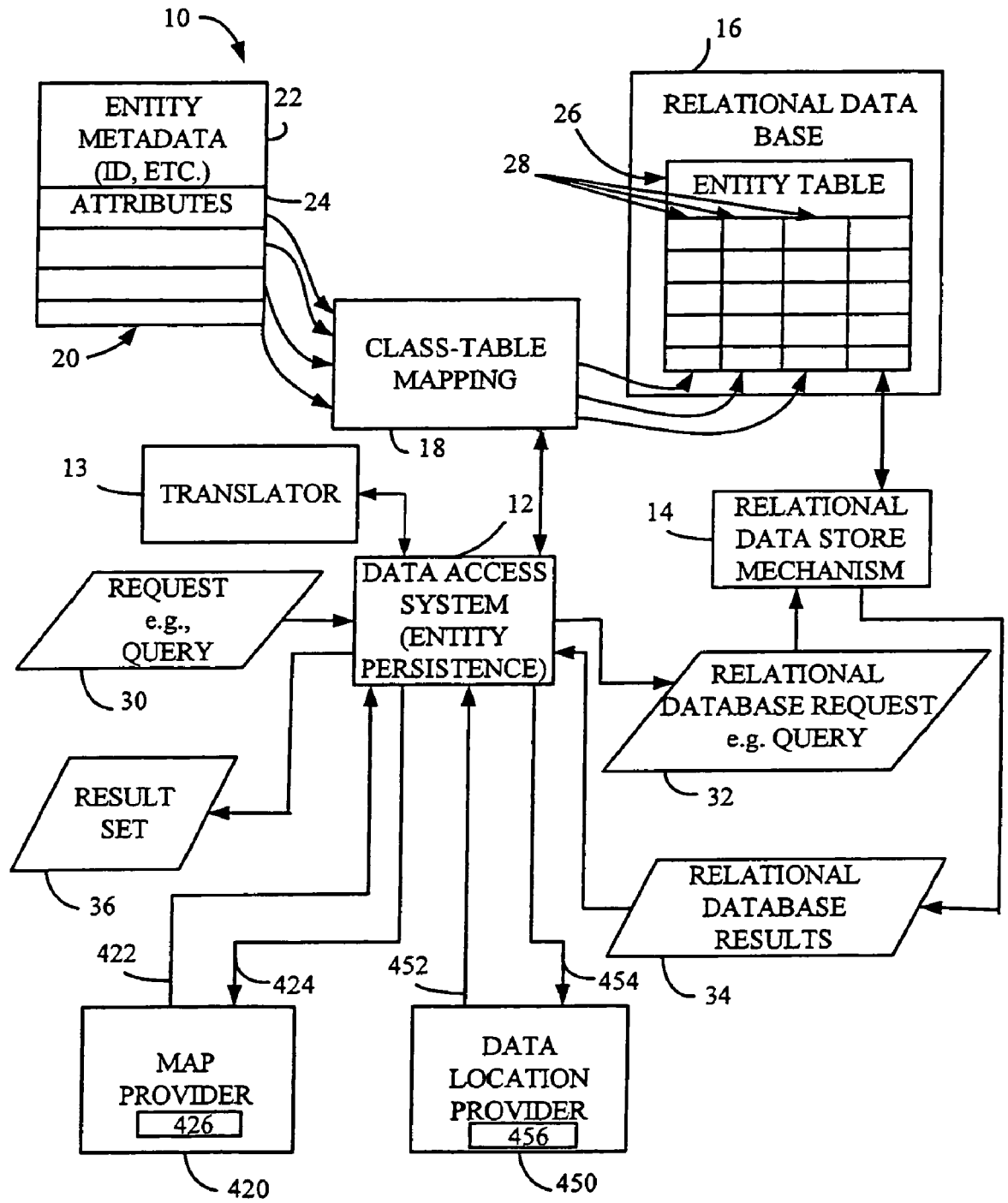
FIG. 1 is a block diagram of one embodiment of an object-relational data storage system.

FIG. 1 is a block diagram illustrating one embodiment of a data storage and accessing system 10 in accordance with the present invention. System 10 includes data access system (or entity persistence system) 12, relational data store mechanism 14, relational database 16, and class-table mapping 18. System 10 is illustratively an object-relational (O-R) data storage system in which stored data can be referred to in terms of entities (or objects) and their properties, rather than elements of the database schema, such as tables and columns. FIG. 1 illustrates one mechanism for doing this.

As shown in FIG. 1, the data can be organized in terms of entities 20 (which is used interchangeably herein with the term objects). Each entity illustratively includes a metadata portion 22 and a remaining attributes portion 24. The metadata portion 22 describes the entity 20, while the remaining attributes 24 define further attributes of entity 20, such as the data stored therein. Each of the attributes in entity 20 is mapped to a corresponding entity table 26 and a specific column 28 in a given entity table 26.

Data access system 12 can receive various forms of requests such as a query 30 which specifies an entity, or portions of an entity or group of entities, to be retrieved. Query 30 can illustratively be expressed in terms of objects ("entities") and properties, rather than in terms of tables and columns. The particular manner in which queries are expressed is described in greater detail below.

In any case, data access system 12 receives the query 30 and accesses class-table mapping 18. In this way, data access system 12 can determine the location of the data for the entities identified by query 30. Data access system 12 includes a translator 13 that translates query 30 into a relational database query 32 which is suitable for input to relational data store mechanism 14. In one illustrative embodiment, relational data store mechanism 14 is a SQL SERVER database server such as that available from the Microsoft Corporation of Redmond, Wash., that accesses a relational database 16. Therefore, data access system 12 receives queries 30 in terms of objects and translates those queries into an appropriate relational database query 32 that is then provided to the data store mechanism (or server) 14 which actually accesses the data in relational database 16.

Relational data store mechanism 14 retrieves the requested data and returns it in the form of relational database results 34. The results are returned to data access system 12 which then formulates the relational database results 34 into a requested result set 36. In one illustrative embodiment, result set 36 is requested in query 30. Query 30 may request that the results be output in the form of one or more objects or simply as a data set. In any case, data access system 12 arranges the relational database results 34 into the proper format and outputs them as result set 36.

Data access system 12 hides the physical data store (mechanism 14 and database 16) from the users and developers enabling them to work in terms of entities rather than requiring them to know both the schema of database 16 and the syntax of the particular data store mechanism 14. Before describing this in greater detail, FIG. 2 shows one embodiment of an environment in which the present invention can be used.

Figure 2:
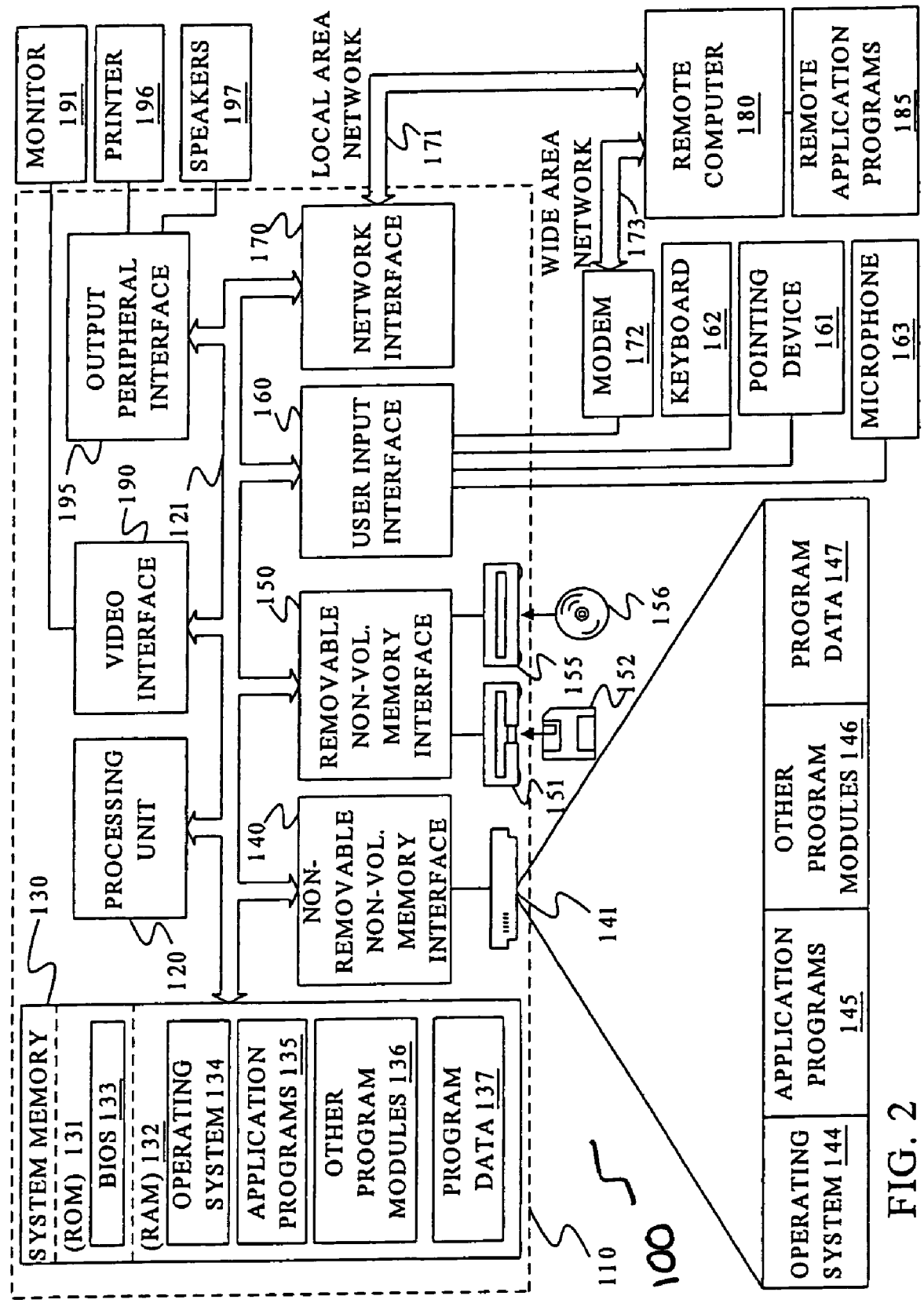
FIG. 2 is a block diagram of an environment in which the present invention can be used.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 2. However, the present invention can be carried out on a server, a computer devoted to message handling, or on a distributed system in which different portions of the present invention are carried out on different parts of the distributed computing system.

Containment Hierarchy

Figure 3:
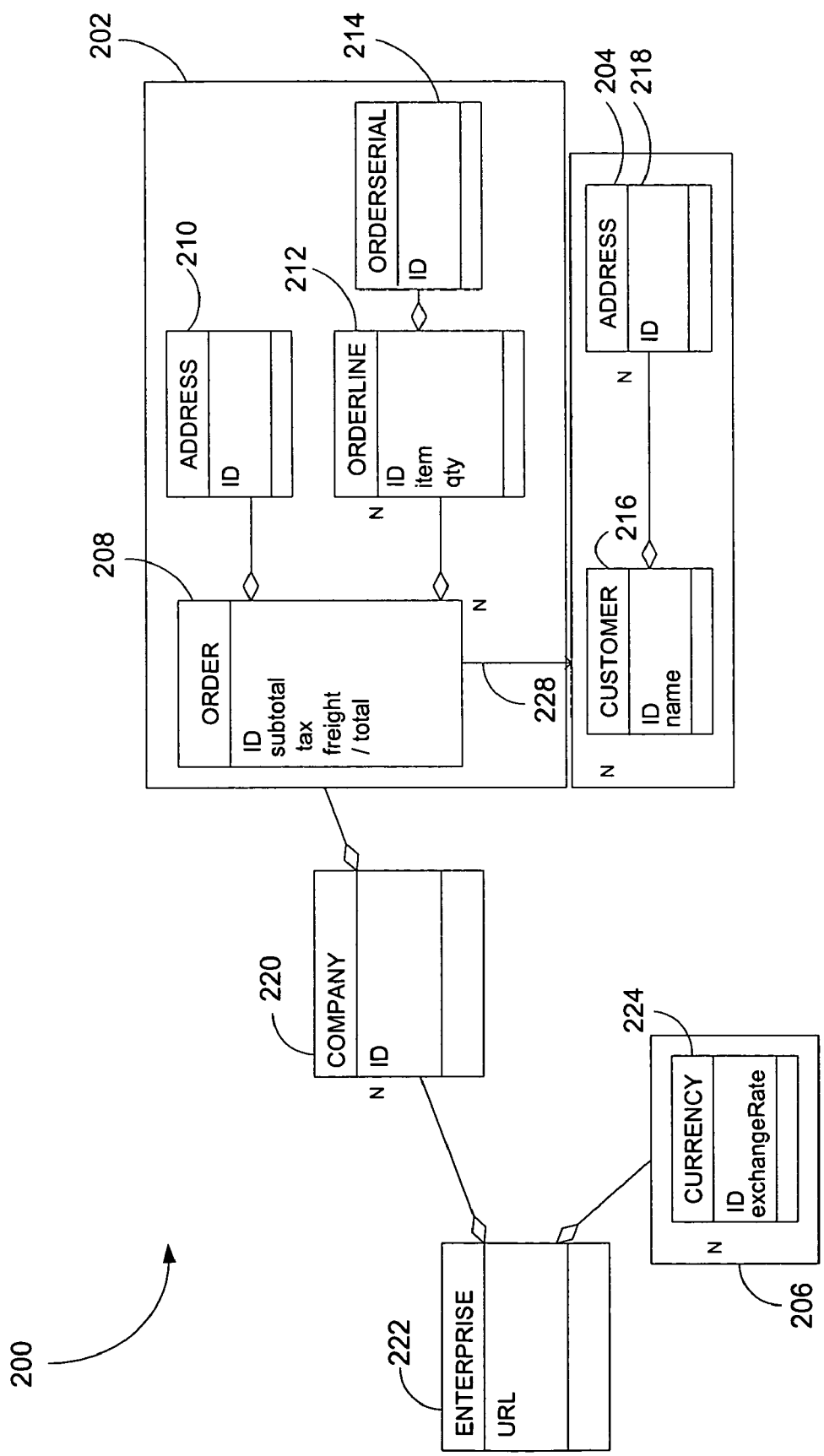
FIG. 3 is a pictorial representation of a containment hierarchy.

FIG. 3 is an example of a hierarchical structure 200 of an exemplary application comprising objects or entities. As illustrated, entities can be organized as components 202, 204 and 206, which can comprise one or more entities. A component, as used herein, is one or more entities grouped together to achieve a common purpose. Although modules implementing the present invention may not include references to components, a developer may want to design the application with components in mind.

In the exemplary embodiment, the entities or objects are organized in a parent/child relationship. Component 202 includes those entities that constitute an Order for a company. In particular, an Order entity 208 includes information such a subtotal, tax, freight and total properties. An Address entity 210 is a child entity of the Order entity 208 and may include information pertaining to the shipping address for a specific order. Likewise, the Order entity 208 may include a number of OrderLine entities 212, while each OrderLine entity 212 can comprise one or more OrderSerial entities 214 having further information. It should be noted that the notation "n" in FIG. 3 is used to indicate that the particular entity could comprise a number of identically structured entities. For example, as indicated above, one or more OrderSerial entities 214 can be a child entity (indicated by the diamond line) of an OrderLine entity 212.

In the example herein illustrated, component 204 generally pertains to Customer information and includes a Customer entity 216, where each Customer entity 216 can include one or more Address entities 218.

The Customer entities 216 and the Order entities 208 are each child entities of a Company entity 220, the set of which comprise child entities of an Enterprise entity 222. Component 206 comprising, in this example, one or more currency entities 224 is also a child of the Enterprise entity 222.

Besides the parent/child hierarchy of structure 200, there also exists, in this example, a uni-directional association between classes of entities. A class is a set of similarly structured entities. As indicated above, all of the Order entities 208 fall within an Order class. Likewise, the Customer entities 216 pertain to a Customer class. The association indicated by arrow 228 denotes that a class may know of another class. In this example, the Order class knows about the Customer class, but does not incorporate or own it such as in the case of a parent/child relationship.

Entity Key

An entity manages data. The entity preserves its internal data and the integrity of its relationships with other entities. Data of the entity is accessed through properties. Each entity is a form of an abstraction. Characteristics of an entity also include that it has an identity, represented by a subclass of an abstract class "EntityKey". Within the overall hierarchy, each entity that manages data in structure 200 is location independent in that it does not know where it is stored or who owns it. However, the EntityKey is used to define its relationship with other entities and can be thought of as being represented by the connections in FIG. 3.

An instance of an entity may be contained within an instance of another entity. The contained entity is called the child, while the container is called the parent. A child instance cannot exist longer than its parent and must have one and only one parent. The set of all such relationships for an application is its containment hierarchy. This sort of hierarchy parallels many business applications. It has been found that supporting this hierarchy makes the system a better fit for developers in constructing business applications.

FIG. 3 is an example of a containment hierarchy for an application. The containment hierarchy describes the types of entities and their corresponding parent-child relationships. There is a root of the containment hierarchy, herein illustrated as the "Enterprise" container 222. The root container or entity commonly supplies the address of a server for the containment hierarchy, although classes or instances can be located on other servers or computer readable media. In one embodiment, the root entity supplies the URL (Universal Remote Locator) of the server. In this embodiment, another broad class of containers are the Company entities 220.

It should be noted that the containment hierarchy is not the same as an inheritance hierarchy. Inheritance hierarchy is a classification of relationships in which each item except the top one is a specialized form of the item above it. In the example of FIG. 3, the Order class 208 and the Customer class 216 are not specialized forms of the Company class 220. Rather, the Order class 208 and the Customer class 216 are different classes holding different types of information. This is not to say inheritance can not be present in the Containment Hierarchy. In some embodiments, an inheritance hierarchy may be present for any class. Thus, for example there can be variations within a class such as variations of the Customer class 216

There are three forms of entities in an application. The forms include the component containers "Enterprise" 222 and "Company" 220, primary entities and supporting entities. The primary or root entity is the focus of a component container of the same name, while supporting entities are either children of the primary entity or its peers. For example, the Order component 202 consists of the Order root entity 208, while the Address 210, OrderLine 212 and OrderSerial 214 are supporting entities. The data for entities is usually stored in database tables such as described above with respect to FIG. 1. Components are a unit of logical design and do not interact with the database.

Figure 8:
FIG. 8 is a pictorial representation of a database table.

As indicated above, each of the properties in an entity 20 is mapped to a corresponding entity table 26 and a specific column 28 in a given entity table 26 as illustrated in FIG. 1. Each entity table also includes, in addition to columns for the attributes, one or more columns that identify all the parents of a particular entity. Referring to FIG. 8 and using OrderSerial by way of example, the OrderSerial Table 250 would include columns for identifiers, in particular, "Company_id" 252, "Order_id" 254, OrderLine_id 256 and Serial Number 258, which may comprise one of the attributes, and which may function as its own identifier (id).

In a relational database, interaction with the table would require specifying each of the identifiers in order to identify and work with the data associated with a particular entity, in this example, data associated with a specific OrderSerial entity 214. However, this information is inferred from its parent in the containment hierarchy. For instance, if one is working with a particular OrderLine entity 212 and now wants to inquire about, or perform an action upon, a OrderSerial entity 214, the data access system 12 can ascertain which OrderSerial entity or entities the user is referring to without needing to reidentify the parents of the entity. In the present invention, the containment hierarchy allows the relationship of the tables (i.e., the identifiers such as illustrated in FIG. 8), and hence, the relationship of the entities, be an implicit background piece of information. In other words, the identity of the entity is inferred from parent/child relationship so that it doesn't need to be restated or managed in other ways. In a relational database system, the identifiers found in the tables used to identify the entity are called a primary key, wherein the combination of the identifiers is unique. However, typically, primary keys are just a collection of columns and have no rich behavior attached to them. In addition, user selected identifiers may only be unique within a certain scope (such as a single business unit) and not unique over the entire range of the application. Surrogate keys, which are commonly generated by the application and hidden from the user, may be unique, but they do not describe hierarchies such as who is the parent of the entity referred to by the identifier.

Another aspect of the present invention is an EntityKey that solves these problems, in particular, the EntityKey associated with each entity allows each entity to be unique throughout the containment hierarchy, as well as infer from the position of the entity within the containment hierarchy who the parents are. An entity is an object that is identified by an entity key, or stated differently, the key for an entity. An EntityKey serves the same function as the primary key on a relational table; however, unlike a relational primary key it is universally unique across the application space and is hierarchical, i.e. it is aware of its position in the hierarchy. In the architecture, the EntityKey is a defined class that is distinct from the entities. The EntityKey class can be mapped to a relational database table in a manner similar to entity 20, class-table mapping 18 and entity table 26. Every entity throughout the hierarchy has one and only one EntityKey value. Given the key for an entity, one can retrieve the entity, whether it is on a local server, or located in a wide area network such as the Internet.

Figure 4:
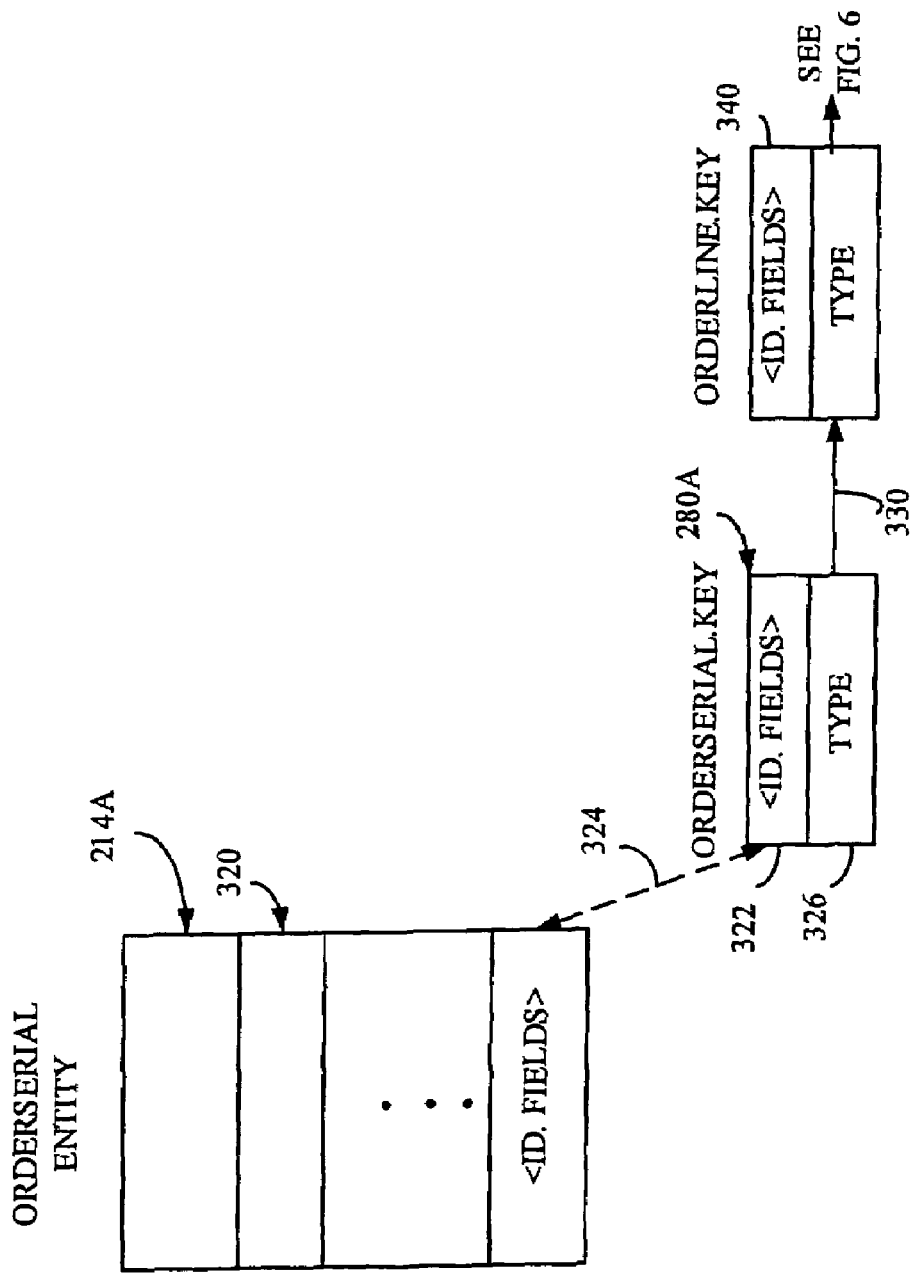
FIG. 4 is pictorial representation of an entity and an entity key.

Each EntityKey contains, for purposes of this concept, three pieces of information: the type or class of the entity to which it refers, the ID of that entity to which it refers and information as to the EntityKey of the parent to that entity. FIG. 4 is a pictorial representation of an EntityKey (herein, OrderSerial.Key) 280A for a particular OrderSerial entity 214A.

Figure 5:
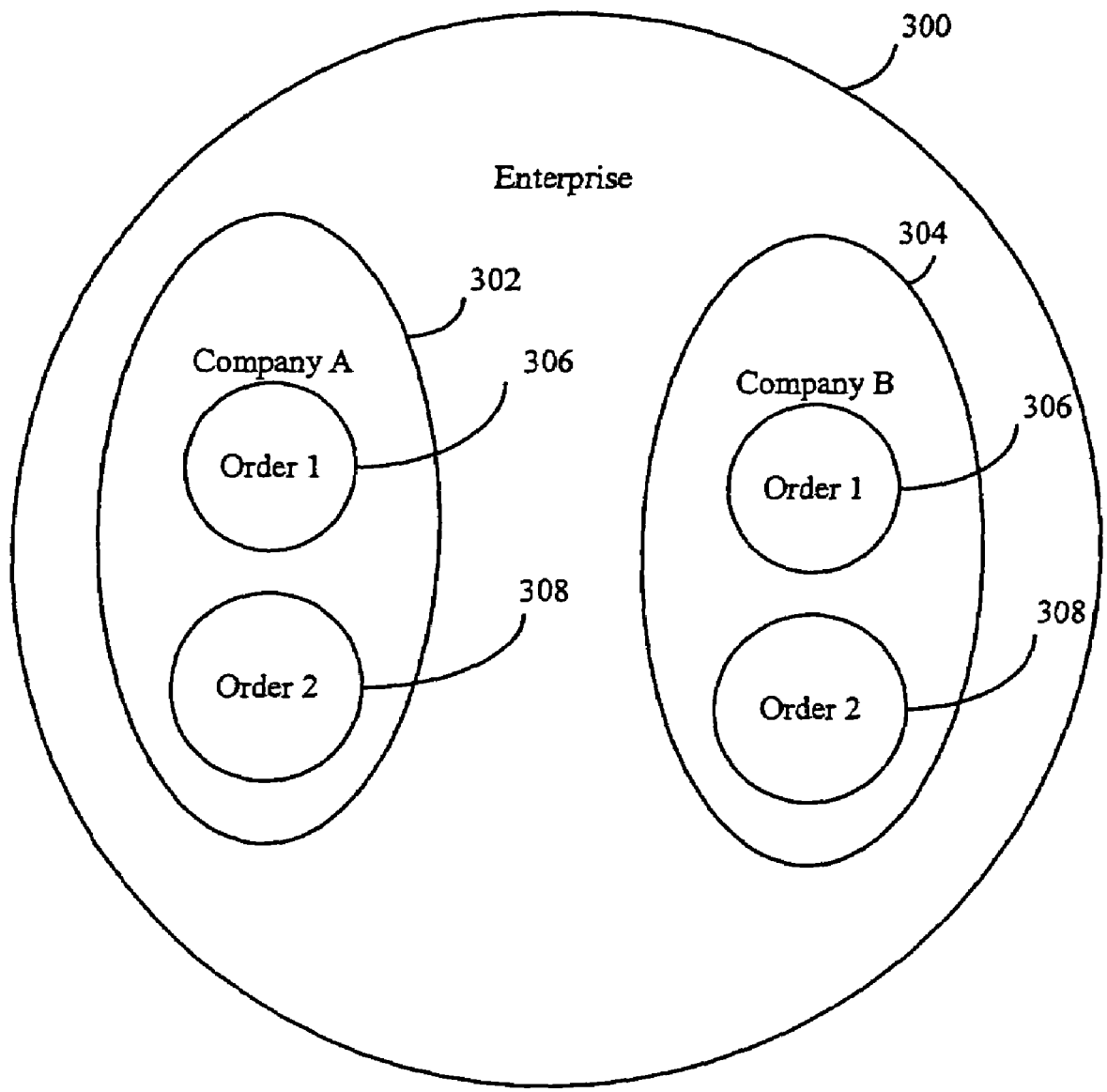
FIG. 5 is a pictorial representation of a business application.

An entity in the hierarchy is fully identified by its identifier plus that of its parents. In this manner, the same local identifier can be used in two or more locations of the overall space because different parents would be involved in uniquely identifying the entity. This may be more readily apparent by pictorially representing the Enterprise space of FIG. 3. Referring to FIG. 5, the Enterprise is indicated by circle 300. The Enterprise 300 can include a plurality of companies, herein Company A 302 and Company B 304. However, each Company 302 and 304 can have two Orders, both having the same identifier, herein "Order 1" 306 and "Order 2" 308. Nevertheless, entities within Company A 302 would still be uniquely identified with respect to entities of Company B 304 although the identifiers for Order 1 306 and Order 2 308 have been used within each Company because each of the entities is uniquely identified by its associated key having the parent/child relationships of the hierarchy.

It should be noted that in many applications, the data for Company A is stored in a completely different database then the data for Company B.

There is also a separate, independent class associated with OrderSerial 214 herein identified as OrderSerial.Key. In general, the EntityKey is of a separate class than the class it refers to. Entity 280A is an example of an object of the OrderSerial.Key class. Referring back to FIG. 4, the OrderSerial entity 214A contains all the attributes 320 relevant to the Order Serial, which could be any number of attributes. The OrderSerial.Key 280A contains a subset of one or more attributes of the OrderSerial entity 214A specifically, the OrderSerial.Key includes identifier attributes 322. Thus, if OrderSerial entity 214A includes a thousand attributes, but two of the attributes make each OrderSerial entity unique, those attributes get copied into the OrderSerial.Key to form the identifier back to the entity. Arrow 324 represents the common identifier attribute or attributes between entity 214A and entity 280A.

The attribute or attributes of the OrderSerial.Key that make each entity of OrderSerial unique is the first element of an EntityKey, which thereby allows the key to be associated with a particular entity.

A second element of an EntityKey is the type 326 of the entity to which it has an identifier. In the present example, the type of the class is OrderSerial.

A third element of an EntityKey is information about the EntityKey of the parent of the entity. In the present embodiment, this information is a reference, indicated by arrow 330, to the parent key 340 corresponding to the parent of entity 214A. In other words, the third element could be a reference to another key. This structure makes EntityKeys recursively defined However, it should be understood that some or all of the parent key information could be stored in the EntityKey directly, if desired. It should be understood that these forms and other similar forms for storing and accessing EntityKey information is intended to be covered herein.

Figure 6:
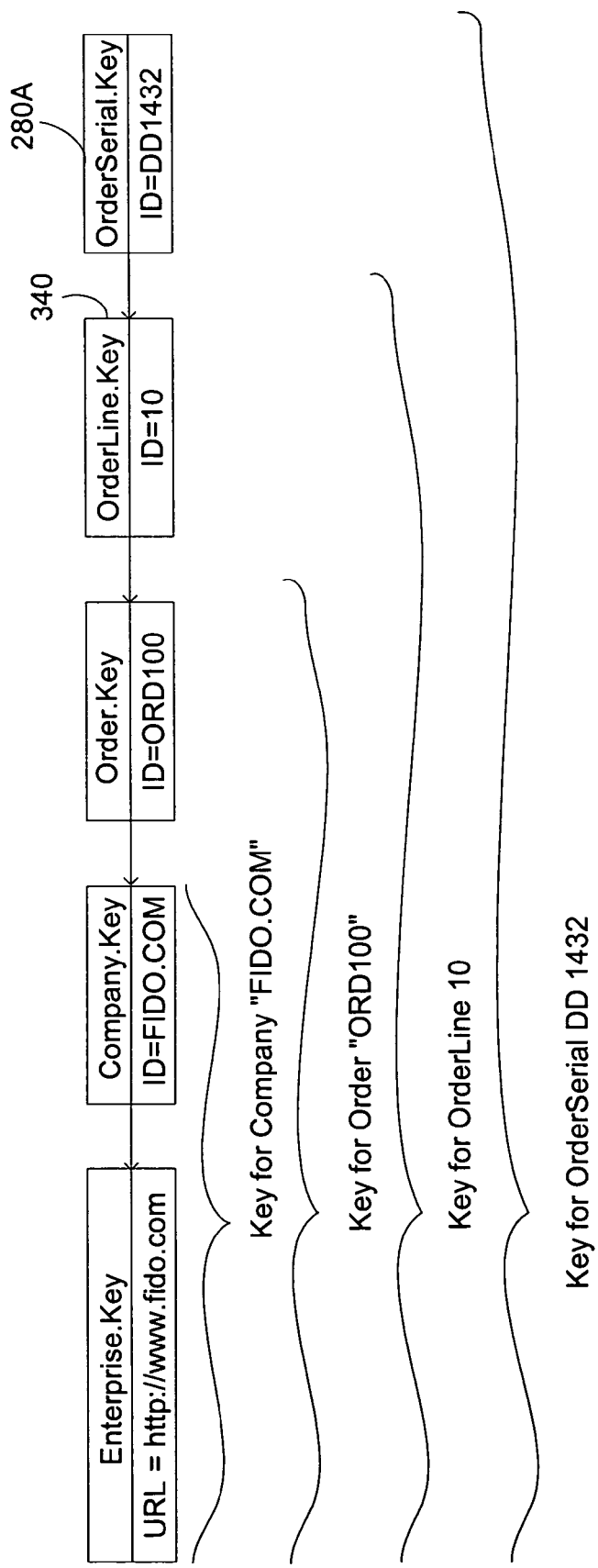
FIG. 6 is a pictorial representation of an entity key.

Referring now to FIG. 6, EntityKeys are provided for an entity of Company, an entity of Order, an entity of OrderLine and entity of OrderSerial. In this example, the ID constitutes one field and the type can be ascertained from the name of the key. For example, type OrderSerial is obtained from the name OrderSerial.Key. References to parent keys are illustrated by arrows. Thus, again, the location of an entity in the hierarchy is completely defined by the associated EntityKey.

In the recursive form of storing EntityKeys, it should be noted that although each EntityKey includes type or class information to which it pertains it does not know the type or class of its parent. That information is found by looking at the type information in the parent key that it references. This is a particularly advantageous feature for it allows classes to be reused throughout the containment hierarchy. Referring back to FIG. 3, it is illustrated that the Order class 202 has a child class of Address 210. Likewise, the Customer class 216 also has a child class of Address 218. The Address classes 210 and 218 are actually conceptually the same; but the instances are disjoint since they are under different parents. However, the entities are uniquely defined in each form of Address class, wherein each Address class 210 and 218 may be stored in a different database table. In this manner, one can describe a position in the containment hierarchy without forcing a class to forever be in that position.

As explained above, each EntityKey has information such as a reference to its parent key, but it does not know what type of parent it is. The decision of what type of parent is made or defined by the mapping(s) 18 illustrated in FIG. 1 for the complete set of classes and tables.

The set of identifiers 322 as illustrated in FIG. 4 of an EntityKey corresponds to the primary key columns of a table holding the data for that entity. Referring to FIG. 8, assume that the primary key of the table holding OrderSerial entities is Company_ID 252, Order_ID 254, OrderLine_ID 256, and Serial Number 258. The identifier attribute 322 in the OrderSerial.Key 280A is mapped directly to the last of the primary key columns, while the parent keys of 280A are mapped to columns 252, 254, 256 in a similar fashion. This EntityKey to database key correspondence also extends to foreign keys. All simple associations between entities are implemented using keys. For example, in FIG. 3, Order.Key would have a reference of type Customer.Key that implements the association from Order to Customer. This key can easily be mapped to the Customer foreign key in the Order table.

It should also be noted that tables are commonly designed with surrogate rather than intelligent keys. An intelligent primary key is seen and specified by the end user, while a surrogate primary key is generated by the application and hidden from the user. Surrogate keys are often used to allow renaming the user visible identifier of a table without database impact or to save space when the size of the primary key is very large and often referenced in foreign keys. When surrogate keys are used, the table will have the surrogate primary key and an alternate key having the user visible identifier.

Both intelligent and surrogate EntityKeys are supported. In the present embodiment, if a surrogate EntityKey is used its ID properties are private (since they are generated and hold ho meaning to the consumer of the entity); otherwise they are public.

Class Key

A second related abstraction is the Class Key. Since a given entity can be used in more than one place in the containment hierarchy, there is a mechanism for indicating which node in the hierarchy to process. The Class Key is that mechanism and contains two pieces of information: the type of the entity to which it refers and information as to the Class Key of the parent of the entity. Note the similarity to the definition of the EntityKey. In fact, the EntityKey is a derivative of and inherits from the Class Key, thereby allowing an EntityKey to be supplied anywhere a Class Key is required. Thus the Class Key is also hierarchically defined. The illustration of FIG. 6 of an EntityKey can be changed into an illustration of a Class Key by simply removing the entity identifiers (IDs).

Generally the Class Key can be used to reference a node in the containment hierarchy as it pertains to classes of entities, particularly describing uniquely a name for each class in the hierarchy as well as its position in the hierarchy. In contrast, the EntityKey provides a unique name for each entity in the containment hierarchy and describes its position in the hierarchy.

The EntityKeys and Class Keys are used when performing create, read, update and delete operations on business objects or entities. For example, when reading an entity, a parent key referring to a component container should be provided. This provides a scope for the read and also makes it easier for the developer to specify a complex location in the hierarchy.

Figure 7:
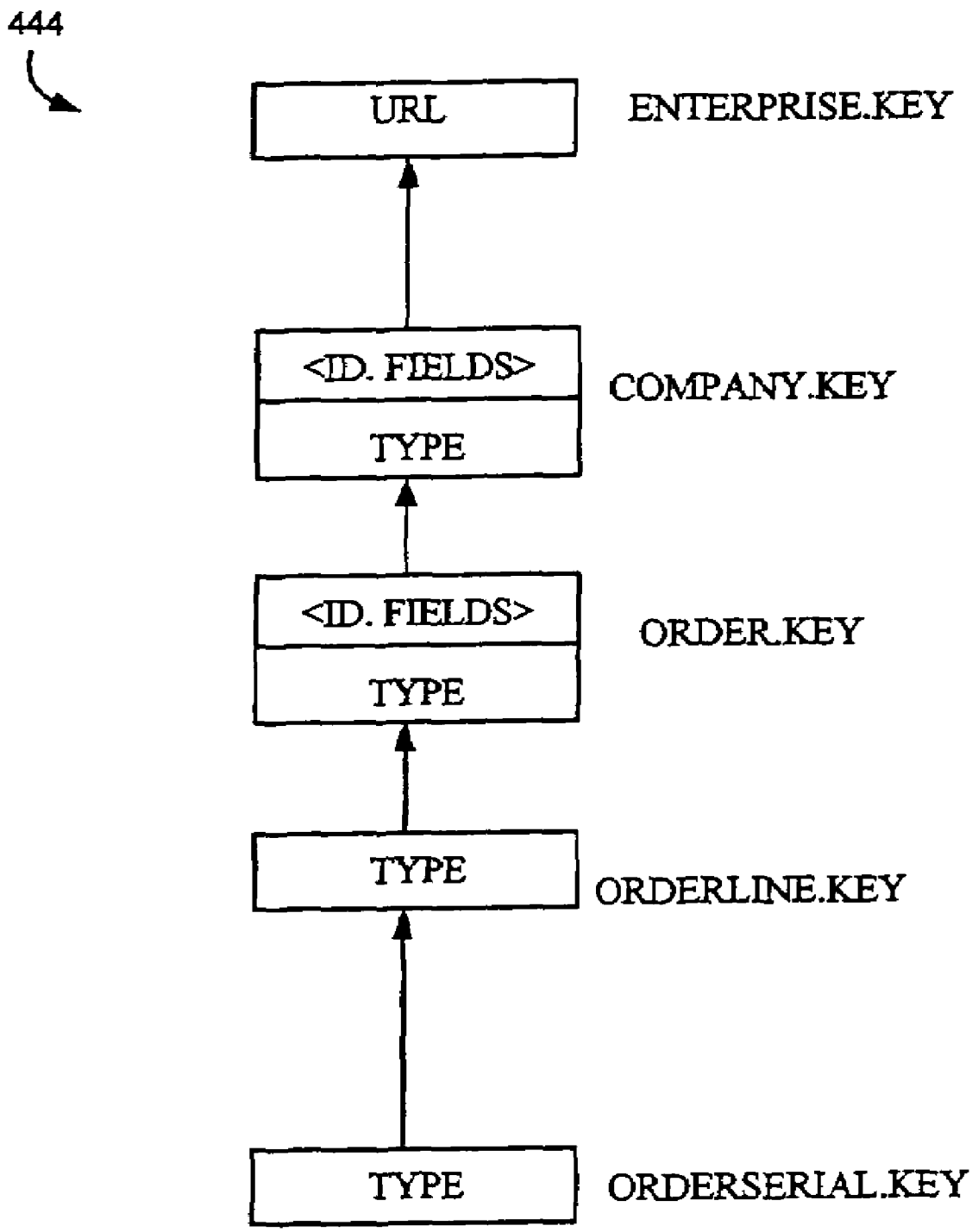
FIG. 7 is a pictorial representation of a blended key.

Besides EntityKeys and Class Keys, another form of key is a blend between these keys. As discussed above, an EntityKey is a form of a Class Key, but includes further information to a particular entity (i.e., its identifier attributes). By simply using a chain of Class Keys followed by Entity Keys, all the entities under a particular parent can be ascertained. FIG. 7 illustrates an example of a blended key 444. In this example, EntityKeys have been provided for the Enterprise, Company and Order, which in turn has specified a particular Order entity. However, since the OrderLine.Key and the OrderSerial.Key do not include Ids, they are Class Keys. The blended key 444 of FIG. 7 could be received by the data access system 12 to formulate a query for data store mechanism 14 to retrieve all series for a particular order, irrespective of line.

Map Provider

In FIG. 1, a class-table mapping 18 describes how an entity (i.e., its properties) is transferred from and to columns of a relational database. As described above with respect to FIG. 3, class names can be reused throughout the hierarchy such as where Address classes 210 and 218 are used as a child class of Order class 208 and Customer class 216, respectively. However, the tables associated with the identically named Address classes 210 and 218 may have different layouts relative to each other and/or different column names found within the tables. Thus, since the layout and/or the column names are different, a unique map must be provided between the class and each respective table in order to provide correct correspondence.

Referring to FIG. 1, data access system 12 can include, or can access as illustrated, a map provider 420. The map provider 420 provides the appropriate map, such that proper correspondence is established between the class and the associated data table. In particular, the map provider 420 receives an identifier 422 as input. Based upon the identifier 422, the map provider provides the appropriate map 424, or a reference thereto, to the data access system 12.

A particular advantageous form of an identifier for the map provider 420 is the containment hierarchy path for each node in the containment hierarchy. For example, given the path "Company/Order/Address", the map provider 420 would provide the map, or reference thereto, for the table corresponding to the Address Class 210. Likewise, given the containment hierarchy path "Company/Customer/Address", the map provider 420 would provide the map associated with the database table for the Address Class 218. It should be noted that in another embodiment, only the entity class name "Address" could be provided to the map provider 420. However, this would require that all tables associated with the Address entity to have the same schema (e.g., same number of columns, same column names, etc.).

Based on the identifier 422 received by the map provider 420, the map provider can access a simple look up table 426 or other form of correspondence to find the appropriate map or the reference thereto.

In some applications, a type or class may have variations, which is known as inheritance. Thus, the identifier 422 provided to the map provider 420 could reflect a class name having the variation rather than the base class. The map location provider 420 provides the map, or reference thereto even if the identifier 422 provided to the map provider 420 includes a variation rather than the base class. The map provider 420 can execute suitable routines to interpret the identifier 422 even given the inheritance contained therein. Likewise, the look up table 426 can be organized such that all the variations are present.

Data Location Provider

The data access system 12 can also include or access a data location provider 450. The data location provider 450 returns the physical location of the data, that is, where the data table is stored. Like the map provider 420 discussed above, the data location provider 450 receives an identifier 452 from the data access system 12 and returns the location 454 of the table associated with the identifier 452. In the illustration of FIG. 5, it was shown that different companies 302 and 304 can form a single Enterprise 300. However, each of the companies 302, 304 may have data stored in different databases, possibly on different servers. In the present embodiment, the component containers (e.g. Enterprise, company) Ids would be included in the containment hierarchy path provided to the data location provider 450 to ascertain which database the data would be found in. By providing a containment hierarchy path, the data location provider 450 will indicate where the associated table is stored, which allows flexibility in where data is to be stored. Like the map provider 420 discussed above, a simple look up table 456 or other form of correspondence can be made between the identifier 452 and information 454 identifying the location of the various data tables. It should be noted that if the look up table 456 is written such that the identifier 452 is merely the name of the class, this would require that all tables associated with that class be located in the same location.

In general, the map provider 420 and data location provider 450 use the containment hierarchy by receiving identifiers 422, 542 related thereto in order to provide flexibility and to define the policies of the application, i.e., how the data tables are structured and where they are located. One benefit is that by providing these policies, application developers do not have to think about these questions each and every time they access data. Using policies removes that burden from the developer and avoids a possible source of problems.

Although the present invention has been described with reference to particular embodiments, workers skilled in the art will recognize that changes may be made in form and detail without departing from the spirit and scope of the invention.

What is claimed is:

1. A computer-implemented data storage system, comprising:
   a relational data store component that stores data pertaining to a plurality of entities;
   a plurality of maps that map the plurality of entities to corresponding data stored in the relational data store component;
   a data access system configured to receive a request to perform an operation on at least one of the plurality of entities;
   a data location provider receiving, from the data access system, an identifier that is related to the request, the data location provider utilizing computer processor that is a functional component of the computer to provide, based at least in part on information reflected in one or more of the maps, information pertaining to a location of data in the relational data store component that is pertinent to the request; and
   wherein the plurality of entities are organized in a child/parent hierarchy, wherein each of the plurality of entities has a unique identifiable position within the child/parent hierarchy; and wherein the identifier is a function of the child/parent hierarchy, wherein the plurality of entities includes a plurality of entities grouped in classes, each class having similarly structured data and being associated with a table in the relational data store component, wherein at least two are associated with entities located in different positions in the child/parent hierarchy.

2. The data storage system of claim 1 wherein the data of the relational data store component is organized in tables.

3. The data storage system of claim 1 wherein the tables that correspond to said at least two classes are similarly named but are structured differently.

4. The data storage system of claim 1 wherein individual entities of at least one class have different parent entities.

5. A method for storing and retrieving data in a database system, the data being stored in a relational database store on a computer readable media, the method comprising:
   obtaining a plurality of maps, wherein each map associates one or more entities with corresponding data stored in the relational database store;
   receiving an identifier that is related to a request to perform an operation on data of an entity; and
   utilizing a computer processor that is a functional component of a computing device to use the identifier as a basis for selecting one or more of the plurality of maps that are related to the request; and
   wherein the data stored in the relational database store is organized in tables, wherein the one or more entities include a plurality of entities grouped in classes, each class having similarly structured data and being associated with a table in the relational data store, and wherein at least two classes are associated with entities located in different position in a child/parent hierarchy.

6. The method of claim 5 and further comprising organizing the entities in the child/parent hierarchy, wherein each entity has a unique identifiable position within the child/parent hierarchy; and wherein the identifier is a function of the child/parent hierarchy.

7. The method of claim 5 wherein the tables that correspond to said at least two classes are similarly named but are structured differently.

8. The method of claim 5 wherein individual entities of at least one class have different parent entities.

9. The method of claim 5 wherein using the identifier comprises determining which of the plurality of maps corresponds to the identifier.

10. The method of claim 5 wherein receiving an identifier comprises receiving an identifier from a data access system.

11. The method of claim 5 wherein receiving an identifier comprises receiving an identifier from a data access system configured to process the request to perform said operation.

12. The method of claim 5 further comprising performing said operation.

* * * * *

UNITED STATES PATENT AND TRADEMARK OFFICE
CERTIFICATE OF CORRECTION

| | | |
|---|---|---|
| PATENT NO. | : 7,613,715 B2 | Page 1 of 1 |
| APPLICATION NO. | : 11/400661 | |
| DATED | : November 3, 2009 | |
| INVENTOR(S) | : Steven P. Anonsen | |

It is certified that error appears in the above-identified patent and that said Letters Patent is hereby corrected as shown below:

In column 13, line 37, in Claim 1, after "utilizing" insert -- a --.

In column 14, line 1, in Claim 1, after "two" insert -- classes --.

Signed and Sealed this
Twenty-second Day of February, 2011

David J. Kappos
*Director of the United States Patent and Trademark Office*